United States Patent [19]

Bree

[11] Patent Number: 4,599,253

[45] Date of Patent: Jul. 8, 1986

[54] METHOD FOR MAKING DECORATIVE EMBLEMS AND THE LIKE AND SHAPES PREPARED BY THAT METHOD

[75] Inventor: Charles E. Bree, Delaware, Ohio

[73] Assignee: The D. L. Auld Company, Columbus, Ohio

[21] Appl. No.: 301,494

[22] Filed: Sep. 14, 1981

[51] Int. Cl.[4] .......................... B32B 3/10; B32B 7/12; B05D 3/12; B05D 5/00

[52] U.S. Cl. ...................................... 428/40; 156/253; 427/258; 427/289; 428/203; 428/209; 428/332; 428/425.8

[58] Field of Search ................ 83/123, 125, 128, 103; 428/40, 203, 209, 332, 425.8; 427/258, 289; 156/253, 268

[56] References Cited

U.S. PATENT DOCUMENTS 1,811,987 6/1931 Wales ................................ 83/128 X
4,292,827 10/1981 Waugh ........................... 29/527.2 X

FOREIGN PATENT DOCUMENTS 53-41879 4/1978 Japan ...................................... 83/103

*Primary Examiner*—Evan K. Lawrence
*Attorney, Agent, or Firm*—Killworth, Gottman, Hagan & Schaeff

[57] ABSTRACT

A method for making decorative emblems, plaques, and other decorative shapes having a clear, strong, weather-resistant, plastic coating over a decorative surface and shapes prepared by that method. The coated shapes are stamped from a substrate using a cutting die in which a pressure platform is resiliently mounted. The platform sandwiches the substrate in the area of the decorative shape against a punch such that the shape is not domed during the cutting operation and the shape obtained is essentially flat. In accordance with one working embodiment, a 2-working station die is employed wherein the shape is cut out with one stroke of the press at a first station using the aforesaid cutting die and the shape is ejected from the substrate at a second station with a subsequent stroke.

9 Claims, 8 Drawing Figures

METHOD FOR MAKING DECORATIVE EMBLEMS AND THE LIKE AND SHAPES PREPARED BY THAT METHOD

BACKGROUND OF THE INVENTION

The present invention relates to a method for making decorative emblems, plaques, and the like (hereafter generically called "decorative shapes") which have a cured plastic layer over a decorative surface and shapes prepared by that method. More particularly it relates to a method in which a plurality of individual coated shapes are stamped from a single substrate without damaging the plastic coat or deforming the shape during the die cutting operation.

Copending U.S. application Ser. No. 054,548 filed July 5, 1979, now U.S. Pat. No. 4,292,827 discloses a process for mass producing decorative shapes in which a smooth coating of a radiation curable polyurethane composition is applied by flow coating to a foil substrate decorated with a series of designs in the form of individual emblems or plaques and backcoated with a layer of adhesive. Using a cutting die such as shown in FIG. 3 individual shapes are stamped from the substrates by pressing the shape contiguous with the decorative design with a male punch into a female cutting die. This imparts a domed shape to the decorative emblem. While in some instances this dome is of aesthetic value, the depth of the dome is difficult to control and the domed shape is difficult to apply to a flat surface or a surface where the radius of curvature is substantially different than that of the dome. Furthermore, when a dome is imparted to the shape as it is die cut, it is difficult to obtain decorative shapes having a sharply cut vertical edge, occasionally the shape may delaminate, scratch or chip, and there is some edge deformation and slivering of the foil substrate. There is also a tendency for the adhesive to ooze from the substrate and contaminate the female die when it is die cut. All of these drawbacks contribute to a reduction in the weather resistance of the cut shape.

A typical decorative shape produced in accordance with the present invention and the aforementioned U.S. patent is stamped from a laminate including a sheet of aluminum painted or silk-screened on one side with a decorative insignia or graphic which is over coated with a layer of cured polyurethane and coated on the other side with an adhesive composition. The adhesive layer is overlayed with a sheet of release paper. One example of this laminate is shown in FIG. 1. When the cutting die strikes this laminar structure, due to the relative softness of the polyurethane and the adhesive composition in comparison to the aluminum sheet, the coated substrate moves slightly with the cutting edge of the die. This causes the substrate to bow under the face of the male punch. Bowing involves the drawbacks mentioned above. In particular; bowing irreversibly domes the decorative shape and produces a shape with poor edge characteristics, which is subject to delamination and has poor weather resistance.

Thus, there is a need for a method of die cutting shapes having a weather and wear resistant plastic coating which does not dome or delaminate the shape and which yields a sharply cut edge and a shape having good weather resistance.

SUMMARY OF THE INVENTION

The present invention provides a method for obtaining essentially flat decorative emblems, plaques and the like with a sharp vertical edge and shapes prepared by that method. In accordance with the invention individual decorative shapes are die cut from a laminated substrate on which a series of decorative designs are reproduced, which designs are overcoated with a layer of cured plastic. The invention uses a cutting die set in which a pressure platform is resiliently mounted in a female cutting die. The pressure platform prevents the substrate in the area of the decorative shape from bowing under the punch by sandwiching the shape between the platform and the punch.

In accordance with the invention as the cutting die set closes on the substrate, the pressure platform biases the substrate against the male punch with sufficient pressure to prevent it from bowing on the face of the male punch. As the press completes its closure, the male punch forces the substrate into the cutting die by depressing the pressure platform. The tension in the platform mount is adjustable such that the platform provides enough resistance to prevent the substrate bowing without otherwise scratching or deforming the plastic coat.

At the completion of the cutting cycle, the press opens, and releases the substrate. The platform under its resilient mounting returns to its pre-cutting position and in so doing, the shape, which is now cut from the substrate, is reinserted in the substrate selvage for carriage to a punching station where the shape is ejected from the substrate and collected.

In accordance with one embodiment of the invention, a 2-working station cutting die set is employed wherein shapes are simultaneously cut and reinserted into the substrate at one station and punched or ejected from the substrate and collected at the other. In a preferred embodiment the substrate from which the shapes are cut and ejected is supported on a resilient table for both operations.

In accordance with another embodiment of the invention the mouth of the female cutting die is provided with a steel rule knife. The knife minimizes the cutting force and delamination, reduces aluminum burring, and provides a sharp vertical edge and also cleanly cuts adhesive and release paper.

Other objects and advantages of the invention will be apparent from the following description, the accompanying drawings and the appended claims.

DETAILED DESCRIPTION OF A PREFERRED EMBODIMENT

Figure 1:
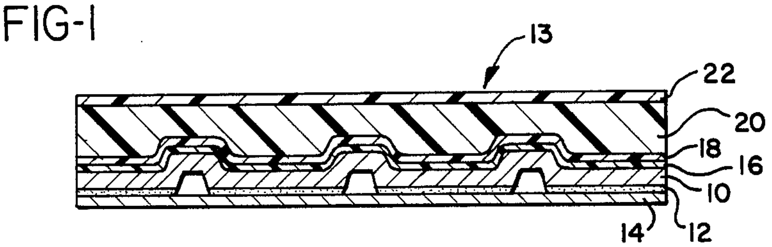
FIG. 1 is sectional view showing the laminar construction of the decorative shapes produced in accordance with the present invention.

The present invention is a process for forming decorative shapes such as that illustrated in cross-section in FIG. 1. A typical shape comprises a substrate 10 which is coated on the back side with a layer of adhesive 12. To prevent the adhesive from inadvertently becoming adhered to a surface or collecting dust or lint, and to facilitate handling the shape is shown with a sheet of release paper 14 releasably laminated to the layer of adhesive 12. The top or graphic surface 13 of the substrate 10 is preferably provided with a layer of primer or a subbing layer 16 on which a decorative design or insignia 18 is painted or silk screen printed. This design is overcoated with a clear plastic layer 20 which beautifies the image and imparts wear and weather resistance to the object. Plastic coating 20 is optionally overcoated with a further protective film 22 such as a film of polyethylene.

Figure 2:
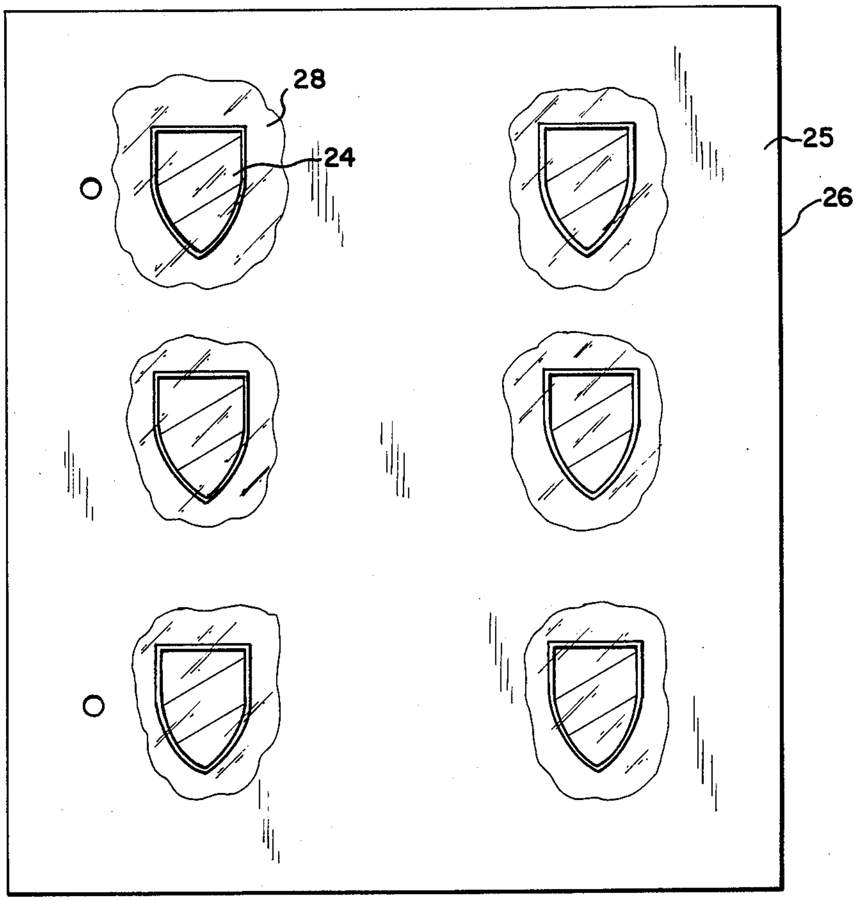
FIG. 2 is a schematic illustration of one example of a coated, laminated substrate prior to cutting in accordance with the invention.

A composite for mass producing these shapes is shown in FIG. 2 wherein an array of designs 24 is formed on graphic face 25 of a sheet of substrate 26. The design areas present a laminar construction as in FIG. 1, however, for simplicity only the plastic coat 28 is separately shown and the laminated substrate is generally designated 26 with the understanding that it represents the laminated substrate structure as shown in FIG. 1. Alternatives to coating local areas of the substrate are to coat the entire sheet of substrate 26 or only the individual designs 24 with plastic. To coat only the design area and not the contiguous surrounding area, the designs may be formed with an edge, dyke or other shapes defined peripheral edge which halts the flow of the plastic at the design edge. The simpler technique however is to deposit an amount of plastic on the design which, when it flows to completion, coats the design and a small amount of the area which immediately surround it, as shown in FIG. 2.

The formulation of the layers which make up the above laminate as well as the coating techniques used to fabricate it are discussed in some detail in the aforementioned U.S. Pat. No. 4,292,827.

The substrate upon which the fluent plastic is coated may be a plastic or metal foil, preferably an aluminum foil 0.003 to 0.020 inch thick. The foil substrate is decorated with an appropriate design or series of designs. More commonly, a series of designs in the form of individual emblems or plaque shapes will be applied to the foil sheet. With a metal foil, the series of designs is preferably applied by silk screen or lithographic printing then the design is enhanced by embossing select areas; although, other means for forming the decorative designs may also be used. The foil may be embossed to give a three dimensional effect to the emblem.

It is desirable to prime the top surface of the substrate prior to printing. Any suitable primer may be used, such as a silane primer. The decorated-primed substrate is then placed upon a vacuum mat which is situated upon a horizontal vacuum table such as that shown in commonly assigned U.S. Pat. No. 4,034,708. Vacuum is drawn against the bottom surface of the foil through the mat to hold the substrate flat and horizontal.

The flow characteristics of the fluent plastic and the liquid wettability of the substrate are used to control the spread of the plastic so that it is contiguous with predetermined areas of the foil as well as being uniformly thick. It is also possible to control the plastic flow by use of sharply defined peripheral sides for the substrate or defined areas of the substrate as disclosed in U.S. Pat. No. 4,292,827.

Flow coating is a path-wise desposition. That is, a multiple orifice nozzle (or nozzles) is passed over the decorated-primed surface of the foil at a steady speed as the substrate is held stationary. The number of orifices used may vary depending on the width of the path to be laid down. The thickness sought is between approximately 0.020 to 0.040 inch.

The plastic is preferably a fluent polyurethane of two component parts (polyol and isocyanate) which are mixed immediately prior to coating and cure upon heating. A polyurethane of this type is disclosed in commonly assigned U.S. Pat. No. 4,100,010.

Basically, that mixture is one of a polyether polyol component ("A"), which may be a difunctional, trifunctional and/or tetrafunctional polypropylene glycol containing a suitable catalyst, and a diisocyanate component ("B") such as an aliphatic diisocyanate. A catalyst such as a lead or mercury material is used since it promotes a slow cure at room temperature so as to allow time for full flow of the liquid polyurethane before setting. As stated in U.S. Pat. No. 4,100,010, which is specifically incorporated herein by reference, an example of the diisocyanate is Hylene W from E. I. du Pont de Nemours and Co., and the polyether polyol may be one or more of the Pluracol materials (P-410 or TP-440) from BASF Wyandotte. It may also be a polyether-polyester polyol combination, use of the polyester polyol making the cured polyurethane more flexible. The ratio of components A:B is preferably 50–60:40–50. A polyester polyol or polylactone polyol could be used in place of the polyether polyol.

In formulating the particular plastic composition from among those disclosed in that patent, it is important to use a catalyst which results in a somewhat slow curing time in order to allow the flow coated liquid plastic to flow sufficiently, i.e., to the sharply defined peripheral sides if ones are used, before curing is accomplished. Otherwise, it may not be possible to obtain a uniform thickness, smooth coating.

Likewise, the polyurethane may be compounded from among components listed in the patent as is known to give a more flexible cured plastic. As long as the bond to the substrate remains strong, it is desirable in this invention to have a somewhat flexible plastic coat so that the emblem or plaque may be conformed. For example, some decorative automobile panels are applied to a curved surface. With the present invention, it is possible to conform the cured plastic coated panel to that surface.

For most of the types of plastic contemplated, curing will be by irradiation with infra-red or ultra-violet light. The polyurethane compounds mentioned above are heat curable and, thus, infra-red lamps are used; although, obviously other heat sources may also be used. Still, it is desirable to get a through cure, i.e., heat from both the top and bottom of the coated foil. The preferred vacuum table arrangement of U.S. Pat. No. 4,034,708 makes this possible because of a capability of heating or cooling it. However, it has been found desirable to use the infra-red lamps themselves as the heat source for both top and bottom heating. This may be done by using an I.R. absorptive mat as the vacuum mat. The mat will, then pick up heat from the infra-red radiation and conduct it back from the bottom through the coated foil.

After curing, the coated substrate is cooled and removed from the vacuum table. Individual emblem or plaque shapes are stamped out by a cutting die around the particular emblem or plaque shape. It has been found that by preventing the coated substrate from bowing while die cutting the decorative shape it is possible to obtain a shape which is essentially flat (except in areas where the shape has been pre-embossed to give depth to the decorative pattern) and which has a sharp vertical edge which resists delamination and provides good eather and wear resistance. In accordance with the invention the shapes are cut from the coated, laminated substrate using a die set such as that illustrated in FIGS. 4 or 5. The die sets shown in FIGS. 4 and 5 are 2-working station sets wherein the coated substrate moves from right to left in the figures. It will be clear that using separate dies for the die cutting and ejecting operations discussed below is equivalent to the 2-working station die sets illustrated. Furthermore, it will be evident that the ejecting operation could be performed manually without a die set.

Figure 3A:
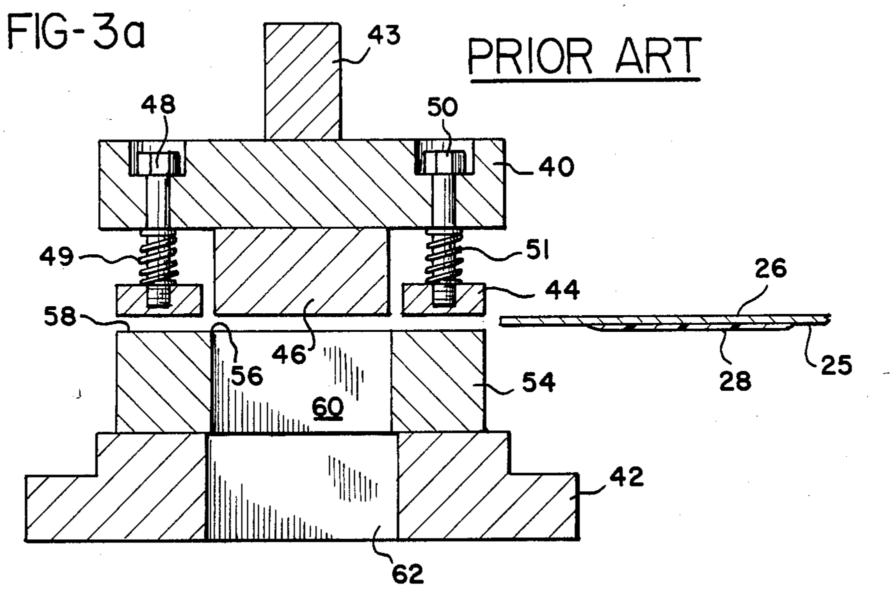
FIG-3a PRIOR ART
FIGS. 3A and 3B are schematic views in section of a cutting die set and method used in a prior process.
Figure 3B:
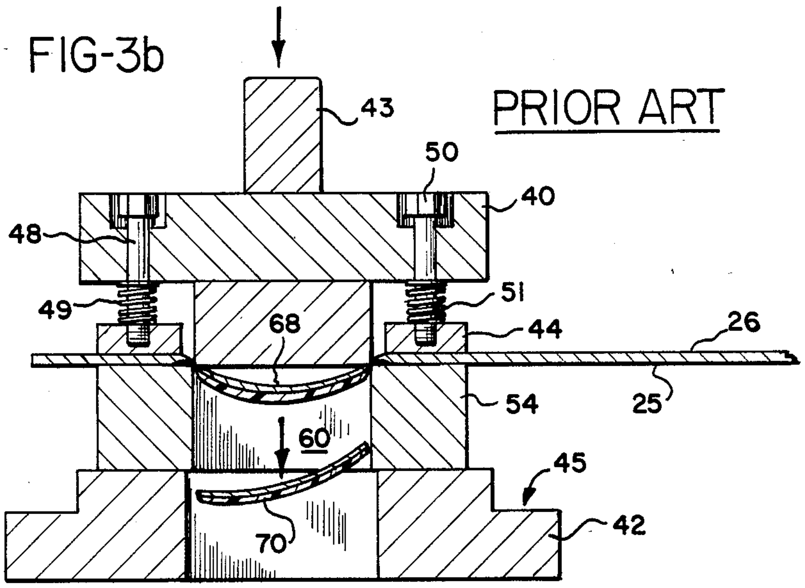
FIG-3b PRIOR ART

As background, a conventional cutting die set is shown in FIG. 3A. This die set comprises a punch holder 40 which is mounted in die cutting relation with a die holder 42. Punch holder 40 is coupled to a press ram (not shown) by shank 43, and die holder 42 is clamped or otherwise mounted to the press bed at ears 45. The punch holder 40 and die holder 42 are aligned by a plurality of guide posts and guide bushings (not shown). Typically the press is mechanically actuated but a hydraulic press may also be used. A male punch 46 is mounted on the punch holder 40 with a surrounding stripper plate 44. The plate 44 contiguously frames the male punch 46 and is mounted for resilient reciprocation on a set of spring-shoulder screw assemblies comprising die springs 49 and 51 carried on shoulder screws or stripper bolts 48 and 50. In FIGS. 3A and 3B, two shoulder screws are shown, another pair of shoulder screws, located on the back side of the stripper plate is not seen in this schematic sectional view. A threaded connection is provided between the plungers 48 and 50 and the stripper plate 44. The stripper plate 44 holds the substrate in place during the cutting operation and cleans any selvage clinging to the punch 46. The position of the stripper plate may be lowered or raised by inserting a shim under the shoulder or body of the shoulder screw. To increase spring pressure, a shim may be inserted under the die spring or a higher pressure die spring can be used.

Die holder 42 carries a female die 54 having a cutting edge 56, a die face 58 and a female die cavity 60. The female die 54 is positioned on the die holder 42 such that the female die cavity 60 opens on an outlet passage 62 formed in the holder 42.

Shapes having a laminar construction such as shown in FIG. 1 are cut from a substrate by positioning the substrate 26 on the face 58 of the female die 54 with its graphic side 25 down and its design area in alignment with the mouth or cutting edge 56 of the die. When the press is closed as shown in FIG. 3B, the substrate 26 is engaged by the stripper plate 44 and the punch 46. As the punch 46 descends into the die cavity 60, the springs 49 and 51 on the shoulder screws 48 and 50 are compressed and the area of the substrate contiguous with the design is engaged by the stripper plate 44. Due to the relative softness of the layers on each side of the substrate 26, the substrate is pulled into the die cavity 60 and bows under the punch 46 as shown by the bow 68 in FIG. 3B. As the punch 46 completes its descent it finally cuts a shape 70 from the substrate 26 contiguous with the design 66. This shape falls from the die cavity 60 through the passage 62 in the holder 46 where it is collected. Due to the bowing which occurs, a dome is imparted to the shape 70 which is shown exiting the press in FIG. 3B.

In accordance with the invention, bowing is prevented by holding the substrate flat on the punch face using a pressure platform which is resiliently mounted in the female cutting die. Furthermore, because cut shapes can no longer be collected from an opening in the base of the female cutting die cavity, they are reinserted in the substrate selvage by the platform after they are cut and ejected by a separate operation which is conveniently performed at another working station in the die set.

Figure 4A:
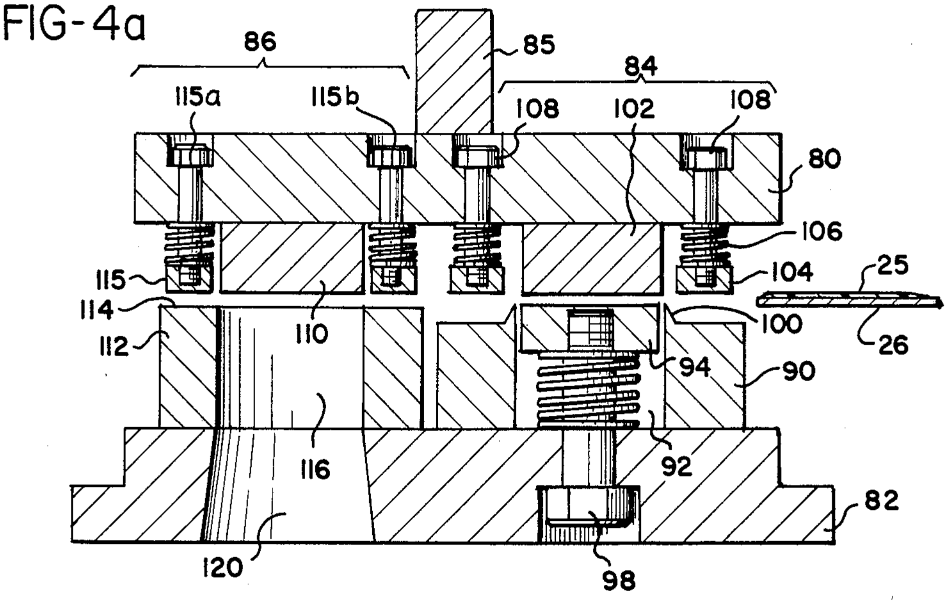
FIGS. 4A and 4B are schematic views in section of a 2-working station cutting die set and method used in the present invention.

Referring to FIG. 4A, the die set comprises a punch holder 80, a die holder 82, a right working station 84 and a left working station 86. In the right station 84, the shape is cut from and reinserted into the substrate 26. In the left station 86, the cut shape is ejected from the substrate by a punch. The die set is mounted to the press ram by shank 85 and fixed to the press bed at ears 87.

The right station 84 includes a female cutting die 90 which is mounted on the die holder 82. The female cutting die comprises a die cavity 92 in which a pressure platform 94 is resiliently mounted on a spring and shoulder screw assembly comprising spring 96 and shoulder screw 98. Embodiments are also envisioned in which a plurality of spring shoulder screw assemblies are used to support the platform depending on the size of the shape cut. The shoulder screw 98 is threaded and screws into the platform 94. The platform in the die cavity and the tension on the spring 96 can be adjusted to provided just enough pressure to prevent the substrate from bowing without deforming the plastic coating over the graphic using shims in a manner analogous to that previously described for the stripper plate 44 in FIG. 3. In accordance with a preferred embodiment of the invention, the mouth of the die cavity 92 is equipped with a knife 100.

Turning to the head portions of the die set, a punch 102 is mounted on the punch holder 80 and framed by a contiguous stripper plate 104. As in FIG. 3, the stripper plate 104 is mounted on a set of four spring shoulder screw assemblies wherein two assemblies are shown in the view with springs 106 carried on shoulder screws 108 which are threaded at the bottom where they connect to the stripper plate 104. Engagement of the stripper plate is adjusted as earlier described.

The left station 86 comprises a second punch 110 mounted on the punch holder 80 and a female die 112 having a die face 114 which is mounted on the die holder 82 such that the die cavity 116 opens into a collection passage 120 formed in the die holder 82. Punch 110 is framed by a stripper plate 115 which is mounted for reciprocating movement on spring-shoulder screw assemblies **115*a* and 115*b*. Plate 115 functions analogous to plate 104 and holds the substrate flat as the cut shape is ejected and removes selvage from the punch 110**.

While in this and the embodiment of the invention subsequently discussed below, the pressure platform 94 is shown resiliently mounted on a spring shoulder screw assembly, those skilled in the art will understand that the spring shoulder screw assemblies illustrated herein may be replaced by other types of resilient mounts including rubber blocks and compressed air or hydraulically actuated cylinders.

Figure 4B:
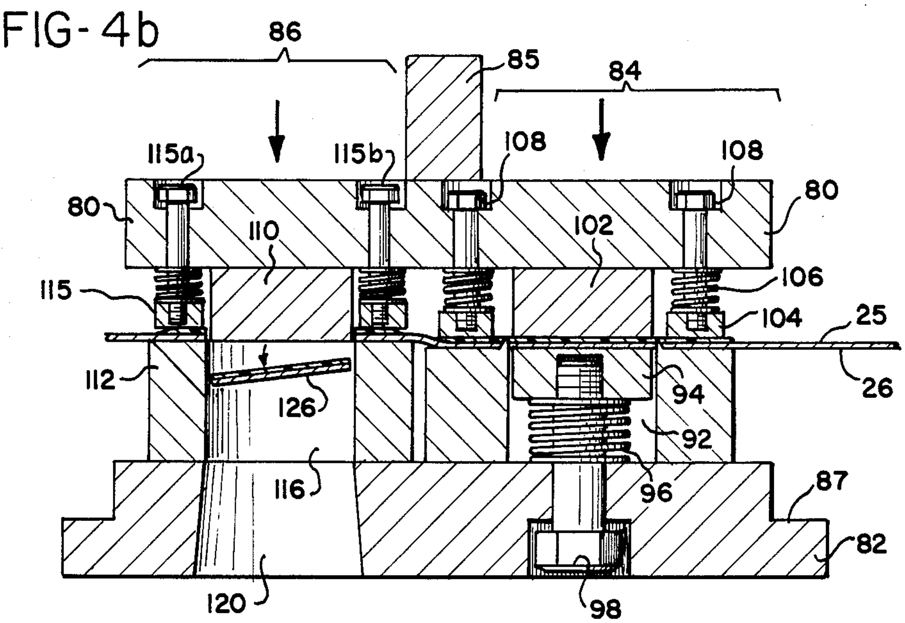

Operation of the die press is shown in FIG. 4*b* wherein the substrate 26, which typically has an array of cured plastic coated designs thereon as shown in FIG. 2 is positioned in the right station 84 with its graphic side 25 facing the punch 102 and its design contiguous with the cutting edge 100 of the die. The pitch of the designs on the substrate is such that a second cut design is simultaneously located over the die 112 in the left station as the first design is cut. Furthermore, the size of the assemblies in the right and left working stations usually dictate that a third cut design be idle between the right and left station as the cutting and ejecting operation proceed.

Turning first to the cutting operation, as the punch holder 80 closes, the punch 102 engages the substrate 26 and presses it against the pressure platform 94. The tension in the spring 96 is such that the pressure platform 94 resists the descent of punch 102 with sufficient tension to prevent the substrate 26 from bowing under application of the punch 102 without otherwise scratching, compressing or deforming the design shape 24 or its clear plastic coating 28. The tension spring 96 and the pressure in platform 94 is adjusted using shims or through the selection of the die spring, such that the substrate is not distorted by cutting and the cut part is returned to the selvage for carriage to the ejecting station. If the spring tension is too much, the part is distorted, if it is too low, it is not returned to the selvage.

As the punch holder 80 completes its closure, under pressure from punch 102, the platform 94 is depressed below the upper edge of the knife 100 and the substrate 26 is urged against the knife 100 whereupon a decorative shape 126 is cut from the substrate 26 and forced into the female die cavity 92. As the press closes, the stripper plate 104 engages the portions of the substrate 26 surrounding the shape 126 to prevent those portions from angling around the knife edge 100 and to assist in obtaining a sharply cut vertical edge.

After cutting decorative shape 126 from the substrate 26, the press opens and punch 102 disengages the substrate. As pressure on platform 94 is released, the platform returns to its original position slightly above the edge of the knife 100 and insodoing reinserts the shape 126 into the substrate 26. At this time, stripper plate 104 is still in pressing engagement with the substrate such that the substrate does not cling to the male punch 102 and the platform 94 is able to reinsert the shape 126 into the substrate without lifting the substrate off the face of the female cutting die.

At the same time shapes are cut at the right station 84, shapes which have been resinserted into the substrate are removed at the left station 86. At the left station 86, the die press closes such that the second punch 110 forces the cut shape 126 out of the substrate 26 and into the cavity 116 of the female die 112 from whence the shape 126 falls under its own weight out of the press through the passage 120 where it is collected. While FIG. 4 illustrates a completely automated system in which decorative shapes are continuously cut at the right working station and ejected from the substrate at the left working station with each stroke of the die set, the ejection operation at the second station can be performed manually. In this case, a cutting die set having only the right station 84 produces a substrate from which the cutout shapes can be pushed, for example, by hand.

Figure 5A:
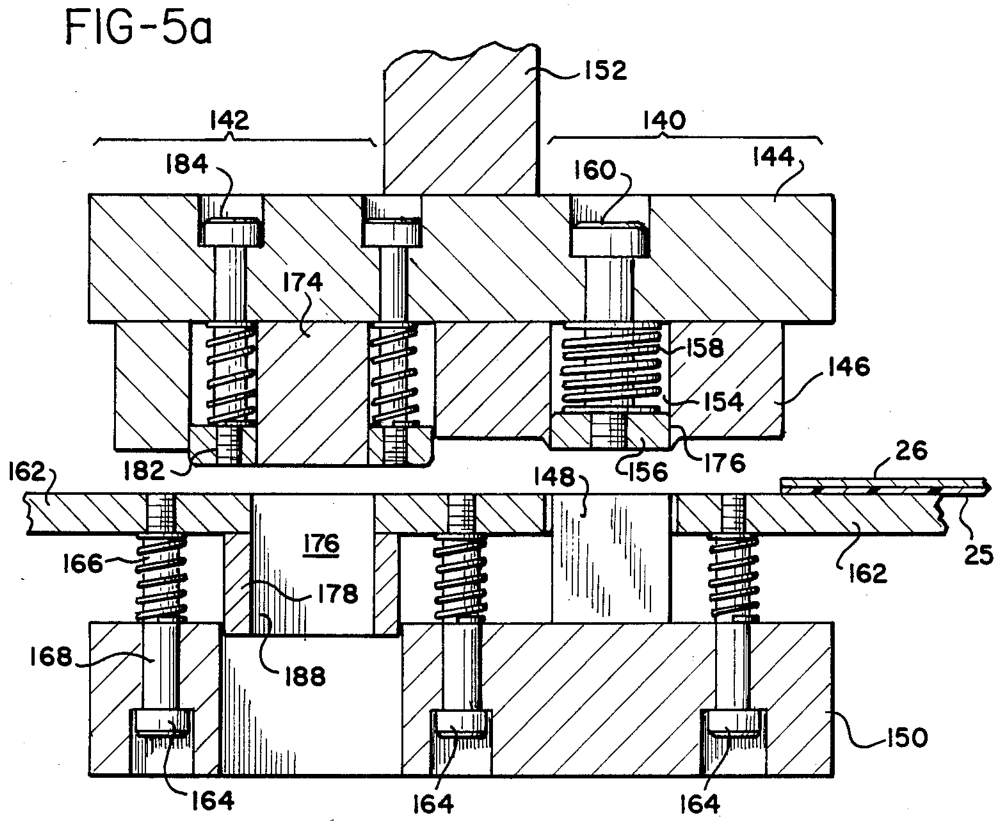
FIGS. 5A and 5B are schematic views in section of another cutting die set and method used of the present invention.
Figure 5B:
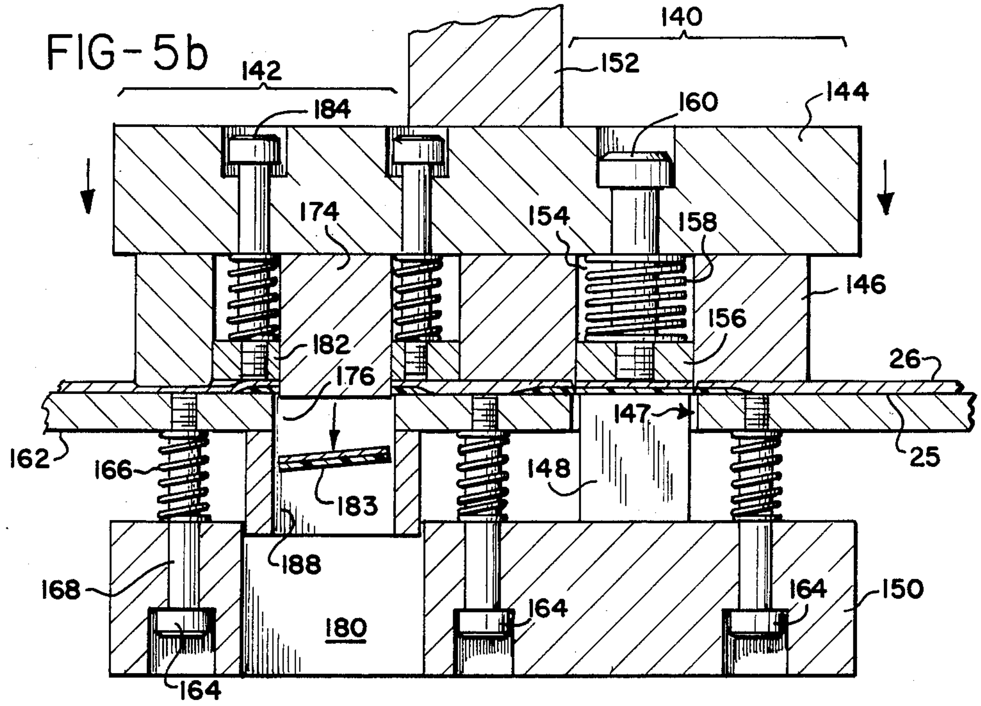

FIGS. 5A and 5B illustrate another embodiment of the invention. In contrast of the previous embodiment, in accordance with this embodiment of the invention, the female cutting die is mounted above the punch and moves into a stationery die punch. Referring to FIG. 5A, as in the case of the aforementioned embodiment, the die set is a two working station die set having a cutting station 140 on the right and a punching station 142 on the left. The punching station 142 may be replaced by its manual equivalent. The cutting station 140 and the punching station 142 share a upper die set holder 144. In the cutting station a female cutting die 146 is mounted on the upper holder 144 in die cutting relation with a male punch 148 mounted on the lower die set holder 150. The upper holder 144 is coupled by shank 152 to a mechanical press (not shown) by a ram cap, the lower holder 150 is secured to the press bed. Alignment of the upper and lower holders is typically by guide posts, also not shown. The female die 146 includes a die cavity 154 in which a pressure platform 156 is resiliently mounted on a spring and shoulder screw assembly comprising a spring 158 carried on a shoulder screw 160 wherein the shoulder screw has a threaded connection with platform 156. Of course, a plurality of spring and shoulder screw assemblies may be used instead of the one shown depending on the design of the shape. Lower holder 150 supports a resilient table 162 mounted on a set of spring and shoulder screw assemblies 164 each assembly comprising a spring 166 carried on a shoulder screw 168 which is mounted by a threaded connection to the table 162. The height of the table 162 and the tension of the springs can be adjusted using shims as previously discussed. The number of spring and shoulder screw assemblies supporting the table 162 will vary depending upon the size and design of the emblem or plaque being cut. In the embodiments shown six shoulder screws are used—the three seen in the view and three on the backside. The male punch 148 is mounted on the lower holder 150 through an opening 147 in the table 162 such that resilient reciprocal movement is permitted between the table 162 and the punch 148 and the table 162 strips any substrate hanging on the punch 148 after cutting.

To cut the substrate, the substrate 26 is positioned in station 140 with its graphic side 25 facing the punch 148 and its plastic coated design aligned with the cutting edge 176 of the die (which is preferably equipped with a steel rule knife as shown). The upper holder 144 moves the die 146 into engagement with the substrate 26 and the punch 148 whereupon the pressure platform 156 is engaged and prevents the substrate from bowing. Upon further descent of the die 146 onto the male punch 148, the pressure platform 156 is depressed with some depression of the resilient table 162 on the die holder 150 whereupon the shape is cut from the substrate. As pressure is released, the resilient table 162 maintains the substrate 26 in contact with the face of the female die 146 such that the pressure platform 156 can reinsert the shape into the substrate as it returns to its original undepressed position.

The left station 142 comprises a male punch 174 mounted on upper holder 144, the resilient table 162, and a channel 188 which is formed by a channel-forming wall 178 which is slidably received in passage 180 formed in the lower holder 150. In the left station 142 as the upper holder 144 descends, the substrate is resiliently engaged between the table 162 and a stripper plate 182 which frames the punch 174 and is mounted resiliently and adjustably on spring and shoulder screw assemblies 184. The male punch 174 subsequently pushes the cut shape 182 through the opening 176 in table 162 and into the channel 188 formed by the channel-forming wall 178 from which it falls out of the press through the passage 180 in the lower holder.

There has been a tendency for shapes to chip slightly at their periphery as they are cut and ejected from the substrate in the manner illustrated in FIG. 4. While this tendency has been quite limited and has not seriously detracted from the commercial acceptability of the cut shapes, the embodiment illustrated in FIG. 5 minimizes peripheral chipping. It has been found that the plastic coating 20 (FIG. 2) is radially compressed as it is cut from the substrate and it expands when pressure is released leaving a slight overhang at the edge. In accordance with the embodiment of FIG. 5, by ejecting the cut shape from the side bearing the plastic coating 20, edge chipping is reduced.

While the methods herein described constitute preferred embodiments of this invention, it is to be understood that the invention is not limited thereto, and that changes may be made therein without departing from the scope of the invention claimed.

What is claimed is:

1. In a method for producing decorative shapes which comprises flow coating a clear, viscous, fluent plastic onto the top surface of a horizontally supported substrate having a series of individual designs provided thereon, curing said fluent plastic and die cutting plastic coated shapes from said substrate contiguous with said designs; the improvement which comprises:

die cutting each of said shapes by application of a female cutting die to one surface of said substrate and a male punch to the other surface of said substrate, said female cutting die comprising a die cavity, a steel rule knife edge at the mouth of said die cavity, a pressure platform mounted in said cavity, and a resilient mounting means supporting said platform, while die cutting said shape, holding said shape against the face of said punch with said platform, and supplying sufficient force to said shape to prevent said shape from bowing.

2. The method of claim 1 wherein said decorative shape is die cut using a die set having a first working station;

said first working station comprising said female cutting die mounted in die cutting relation with said male punch such that upon the application of pressure to said female cutting die and/or said male punch, said substrate is engaged between said resiliently mounted platform and said punch, said platform is depressed, and said shape is cut from said substrate and pressed into said die cavity; and following said die cutting, said method further comprises reinserting said shape into said substrate by said platform.

3. The method of claim 2 wherein a stripper plate is resiliently mounted about said punch such that said plate contiguously frames said punch and said plate engages the portions of said substrate surrounding said shape as said shape is cut from and reinserted in said substrate.

4. The method of claim 3 wherein following said reinserting, said method further comprises ejecting said shape from said substrate at a second working station, said second working station comprising means for ejecting said cut and reinserted shape from said substrate.

5. The method of claim 4 wherein said second working station comprises a second punch mounted in die-cutting relation with a support member having an opening formed therein for receiving said punch and exiting said shape.

6. The method of claim 5 wherein a stripper plate is resiliently mounted about said second punch such that said plate contiguously frames said punch and said plate engages the portions of said substrate surrounding said shape as said shape is ejected from said substrate.

7. The method of claim 6 wherein said shape has a layer of an adhesive and a release liner on the surface of the substrate opposite said plastic.

8. The method of claim 1 wherein said decorative shape are die cut using a die set wherein said die set comprises:

a first support member, a second support member, a female cutting die mounted on said first support member, a first punch co-mounted on said first support member with said female cutting die, a table resiliently mounted on said second support member resilient mounting means mounting said table on said second support member, said table having a first opening and a second opening therein, a second punch mounted on said second support member through said first opening in said resiliently mounted table, a passage formed in said second support member and aligned with said second opening in said resiliently mounted table, wherein said first and second support members are mounted for reciprocation with said female cutting die mounted in die-pressing relation with said second punch and said first punch mounted in die-pressing relation with said second opening in said resilient table such that upon the application of pressure to said support member, at said female cutting die said substrate is engaged between said resiliently mounted platform and said punch with a pressing force which prevents said substrate from bowing without otherwise deforming said substrate, said platform is depressed and said shape is cut from said substrate and pressed into said die cavity, and upon releasing said pressure, said substrate is disengaged by said punch and said resiliently mounted platform reinserts said shape into said substrate, and at said first punch, said cut and reinserted shape is ejected from said substrate and through said passage in said second support member.

9. A decorative shape comprising a laminate of:

a metal foil substrate having a top surface and a bottom surface, an adhesive composition layer coated on said bottom surface of said substrate, a protective sheet releasably laminated to said adhesive composition layer, a graphic formed on the top surface of said substrate, and a clear, weather-resistant layer of a polyurethane composition, said polyurethane layer being approximately 0.02 to 0.04 inch thick and being flow coated over said graphic, said shape being essentially flat and undomed and having sharply cut burr-free, substantially vertical edges, wherein said shape is die cut by application of a female cutting die to one surface of said laminate and a male punch to the other surface of said laminate, while preventing said laminate from bowing, said female cutting die comprising a die cavity, a steel rule knife edge at the mouth of said die cavity, a pressure platform mounted in said cavity, and a resilient mounting means supporting said platform, wherein as said laminate is die cut, said laminate is engaged in the area of said designs between the face of said punch and said resiliently mounted platform, and sufficient force is applied to said substrate against said punch that said substrate cannot bow under said punch as said shape is cut.

* * * * *